United States Patent [19]
Kawabata

[11] Patent Number: 5,150,917
[45] Date of Patent: Sep. 29, 1992

[54] ACTIVE SUSPENSION SYSTEM WITH CONTROL TO CHANGE VARIATION IN PRESSURE OF WORKING FLUID CYLINDER BETWEEN INCREASE AND DECREASE THEREOF

[75] Inventor: Kazunobu Kawabata, Kanagawa, Japan

[73] Assignee: Nissan Motor Company, Limited, Japan

[21] Appl. No.: 706,443

[22] Filed: May 28, 1991

[30] Foreign Application Priority Data

May 31, 1990 [JP] Japan .................................. 2-142854

[51] Int. Cl.⁵ .......................... B60G 11/26; B60S 9/00
[52] U.S. Cl. .................................... 280/707; 280/703; 280/6.12; 364/424.05
[58] Field of Search .................... 364/424.05; 280/707, 280/703, 714, 709, 6.12, DIG. 1

[56] References Cited

U.S. PATENT DOCUMENTS 4,903,983  2/1990  Fukushima et al. .
5,016,907  5/1991  Akatsu et al. ........................ 280/707
5,071,158  12/1991  Yonekawa et al. .................. 280/707

FOREIGN PATENT DOCUMENTS

63-130418  6/1988  Japan .
64-87902   4/1989  Japan .

Primary Examiner—Charles A. Marmor
Assistant Examiner—Paul Dickson
Attorney, Agent, or Firm—Lowe, Price, LeBlanc & Becker

[57] ABSTRACT

An active suspension control system includes working fluid cylinders which are respectively disposed between a vehicle body and suspension members which support road wheels rotatably. The working fluid cylinder includes a piston slidably arranged therein for adjusting a relative distance between the vehicle body and the suspension member to suppress vehicle attitude change. The system includes a pressure control unit which is responsive to vehicle attitude change to control fluid pressure to be supplied to the working fluid cylinders to cause the piston to slide such that an increase in the fluid pressure is provided which is lower than a decrease in the fluid pressure. This restricts friction, caused by fluid pressure elevation in the working fluid cylinder, created between the piston and a seal ring to allow the piston to move smoothly.

7 Claims, 7 Drawing Sheets

ACTIVE SUSPENSION SYSTEM WITH CONTROL TO CHANGE VARIATION IN PRESSURE OF WORKING FLUID CYLINDER BETWEEN INCREASE AND DECREASE THEREOF

BACKGROUND OF THE INVENTION

1. Field of The Invention

The present invention relates generally to an active suspension system for a vehicle which is operable to suppress bouncing, rolling, or pitching motion of a vehicle body. More particularly, the invention relates to an active suspension system which is responsive to vehicle attitude change to adjust pressure of working fluid cylinders interposed between suspension members and a vehicle body with variations different between increase in the pressure of the working fluid cylinder and decrease in the pressure thereof for providing low friction between a piston rod and a seal ring of the working fluid cylinder.

2. Description of The Background Art

Japanese Patent First Publication No. 63-130418 discloses an active suspension control system for a vehicle. This system includes a vertical acceleration sensor, a lateral acceleration sensor and a longitudinal acceleration sensor, which monitor vehicle attitude change. The system is operable to control pressure control valves to adjust pressure supplied to hydraulic cylinders disposed between road wheels and a vehicle body respectively according to values monitored by the sensors, for suppressing vehicle attitude change.

In such a working fluid cylinder utilized in an active suspension system, highly pressurized working fluid is supplied to a pressure chamber of the cylinder to displace a piston rod for suppressing vibrations of a vehicle body. Thus, if a sealing member is utilized for preventing working fluid in the pressure chamber from leaking, friction created between a piston rod and the sealing member is subject to increase as pressure in the pressure chamber is elevated, causing the piston rod to slide unsmoothly.

In order to avoid such drawbacks, Japanese Patent First Publication No. 64-87902 discloses an improved hydraulic cylinder. This cylinder includes sealing members for sealing a piston which defines working chambers and a check valve arranged between a reservoir chamber and a reservoir tank. The sealing member is adapted for allowing hydraulic fluid to leak therethrough. The check valve allows hydraulic fluid to be directed from the reservoir chamber to the reservoir tank. Supplying pressure to the working chambers causes the hydraulic fluid to leak between the sealing members and corresponding parts. The leaked fluid forms a hydraulic film on the parts to reduce friction between the sealing members and the parts, resulting in smooth motion of the piston rod.

If the above prior art hydraulic cylinder is used in an active suspension system for a vehicle, friction is created between a piston rod and a sealing member which is smaller than that of the above mentioned liquid-tight seal type hydraulic cylinder. However, even in such a hydraulic cylinder, a fluid supply to the hydraulic cylinder at the high pressures required for active suspension control causes the sealing member to seize against the piston rod, resulting in increased friction to interfere with smooth sliding motion of the piston rod. Thus, road vibrations through wheels are transmitted directly to a vehicle body, giving passengers an unpleasant feeling.

SUMMARY OF THE INVENTION

It is therefore one object of the present invention to avoid the disadvantages of the prior art.

It is another object of the invention to provide an active suspension system which is operable to control pressure of working fluid to be supplied to a suspension actuator so as to restrict increase in friction created between a piston rod and a seal ring, caused by elevation in the working fluid pressure in the suspension actuator.

According to one aspect of the present invention, there is provided an active suspension control system for a vehicle which comprises a sensor means for sensing vehicle attitude change to provide a signal indicative thereof, suspension assemblies including actuators which are respectively disposed between a vehicle body and suspension members which support vehicle wheels rotatably, each of the actuators including a sliding member which slides in the actuator to adjust a relative distance between the vehicle body and the suspension member to suppress vehicle attitude change, a fluid power source unit which supplies pressurized fluid to the actuators for displacing the sliding member dependent upon the magnitude of fluid pressure, and a pressure control means responsive to the signal from the sensor means for controlling the fluid pressure supplied from the fluid power source unit to the actuators dependent upon an amount of the vehicle attitude change to suppress vehicle attitude change, the pressure control means decreasing the fluid pressure by a first ratio and increasing the fluid pressure by a second ratio smaller than the first ratio by a preselected value for restricting friction caused by increase in the fluid pressure in the actuator which impinges upon sliding movement of the sliding member.

In the preferred mode, the pressure control means multiplies an amount of vehicle attitude change sensed by the sensor means by a control gain to determine variations in the fluid pressure to be supplied to the actuators required for active suspension control. The control gain is provided with a first gain when decreasing the fluid pressure and a second gain smaller than the first gain by a preselected value when increasing the fluid pressure.

Additionally, the pressure control means may determine a variation in the fluid pressure to be supplied to the actuators based on the vehicle attitude change sensed by the sensor means to provide a first pressure level lowered by the determined variation and a second pressure level elevated by the determined variation which are required for suppressing vehicle attitude change. The pressure control means decreases the fluid pressure toward a level which is lower than the first pressure level by a first value and increases the fluid pressure toward a level which is lower than the second pressure level by a second value.

DESCRIPTION OF THE PREFERRED EMBODIMENT

Figure 1:
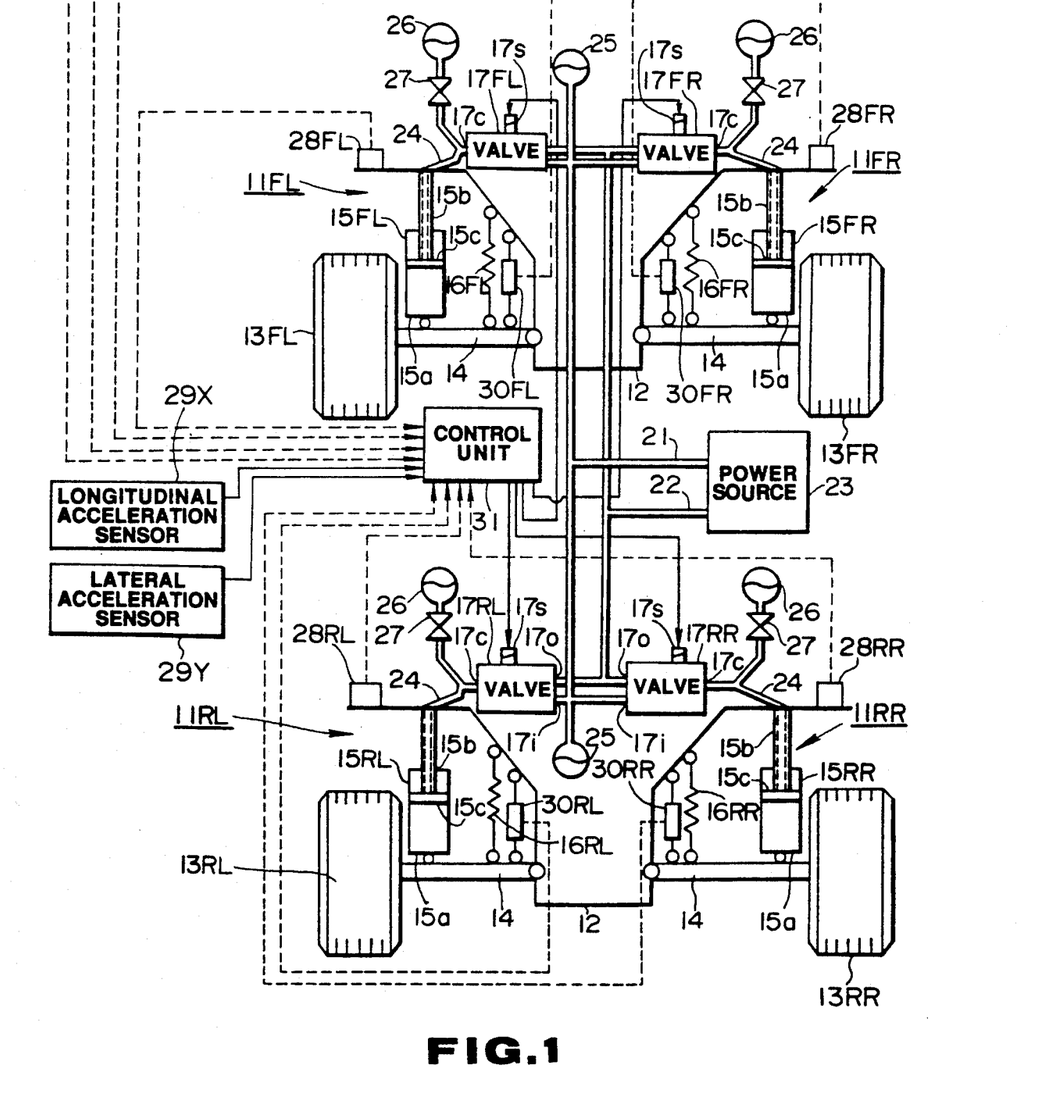
FIG. 1 is a schematic view which shows an active suspension system according to the present invention.

Referring now to the drawings, particularly to FIG. 1, an actively controlled suspension system for a vehicle according to the present invention is shown which is operable to effect suspension control for regulating vehicle height level and vehicle attitude by suppressing relative displacement between a vehicle body 12 and suspension members 14. This system generally includes four suspension units 11FL, 11FR, 11RL, and 11RR which are disposed between front and rear wheels 13FL, 13FR, 13RL, and 13RR and the corresponding suspension members 14 which support the vehicle body 12 and the wheels. The suspension units include working fluid cylinders 15FL to 15RR such as hydraulic cylinders, coil springs 16FL to 16RR arranged parallel to the hydraulic cylinders 15FL to 15RR, and pressure control valves 17FL to 17RR each being responsive to a signal from a control unit 31, as will be described hereinafter in detail, to control pressure of working fluid supplied to the hydraulic cylinders 15FL to 15RR.

Figure 2:
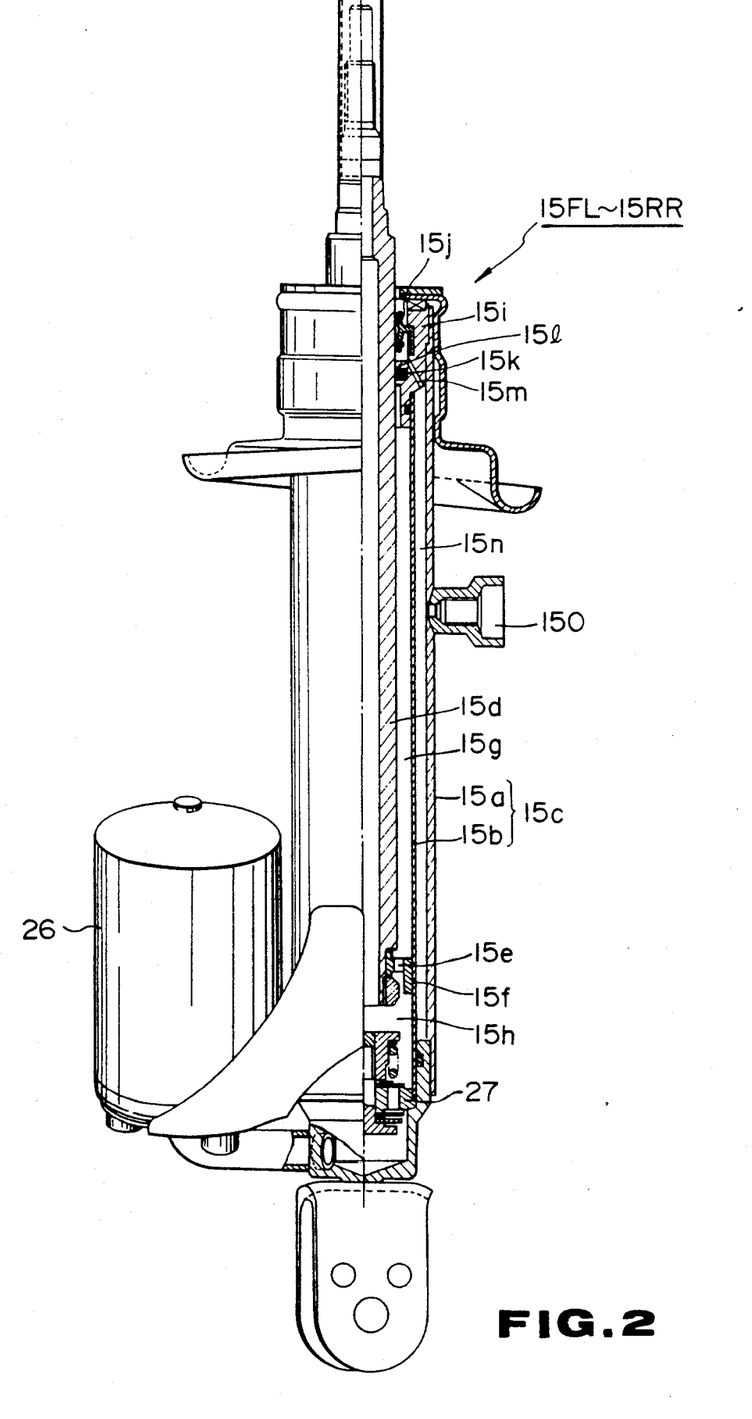
FIG. 2 is a partly sectional front view which shows a working fluid cylinder applicable to an active suspension system of the present invention.

Referring to FIG. 2, a hydraulic cylinder according to the present invention is shown which includes double cylinder tube 15c which is provided with an outer tube 15a and an inner tube 15b, a piston rod 15d, and a piston 15f which defines upper and lower pressure chambers 15g and 15h within the cylinder tube 15c. The cylinder tube 15c is attached to the suspension member 14, while the piston rod 15d is attached to the vehicle body 12. The piston 15f has a through hole 15e which fluidly communicates between the upper and lower pressure chambers 15g and 15h and is operable to provide thrust to the piston rod 15d dependent upon a difference in the areas of both sides thereof, on which working fluid pressure supplied from the pressure control valves 17FL to 17RR acts.

A plug 15i is tightly inserted into an upper end portion of the upper chamber 15g to establish liquid-tight seal with an inner surface of the outer tube 15a. The plug 15i includes an oil seal 15j which is installed in an inner surface of a recessed portion thereof to contact with an outer surface of the piston rod 15d and a seal ring 15l made of low friction materials such as tetrafluoroethylene which is arranged below the oil seal 15j and is urged inwardly by an O-ring 15k. The seal ring 15l allows the working fluid to be leaked therethrough, which, in turn, flows through a fluid path 15m into a reservoir chamber 15n defined between the outer and inner tubes 15a and 15b. The working fluid accommodated in the reservoir chamber 15n is returned to a hydraulic power source 23 through a drain port 15o. The lower pressure chamber 15h is fluidly communicated with an accumulator 26 which is fixed on a lower peripheral surface of the cylinder tube 15c via a throttle, or orifice 27, as will be described hereinafter, which is formed on a bottom of the inner tube 15b. The accumulator serves to absorb pressure variations caused by unsprung vibrations. It will be appreciated that a supply of pressure to the lower pressure chamber 15h through the inside of the piston rod 15d causes pressure of the upper and lower pressure chambers 15g and 15h to rise toward a preselected level, excess working fluid being partly leaked from an upper end of the upper pressure chamber 15g to the reservoir chamber 15n through a slight gap between the seal ring 15l and the piston rod 15d. This working fluid leakage forms an oil film on an inner peripheral surface of the seal ring 15l to allow the piston rod 15d to slide smoothly within the inner tube 15b without friction with the seal ring 15l.

The coil springs 16FL to 16RR serve to support static load of the vehicle body which may have a low spring constant supporting the static load only.

The pressure control valves 17FL to 17RR include respectively an inlet port 17i, a return port 17o, a control port 17c, and a spool (not shown) slidably disposed in a valve housing. The spool serves to block fluid communication between the control port 17c, the inlet and return ports 17i and 17o and establish fluid communication between the control port 17c and either the inlet or return ports 17i and 17o. Supply and control pressures act on both sides of the spool. Additionally, a poppet valve (not shown) is provided at an outlet port portion in the valve housing which is controlled by a proportional solenoid 17s to maintain pressure at a level according to exciting currents $I_{FL}$ to $I_{RR}$ applied to the solenoid from a control unit 31 as will be described hereinafter.

U.S. Pat. No. 4,903,983, issued on Feb. 27, 1990, discloses an active suspension system which include pressure control valves which are applicable to the present suspension control system, disclosure of which is incorporated herein by reference.

Figure 3:
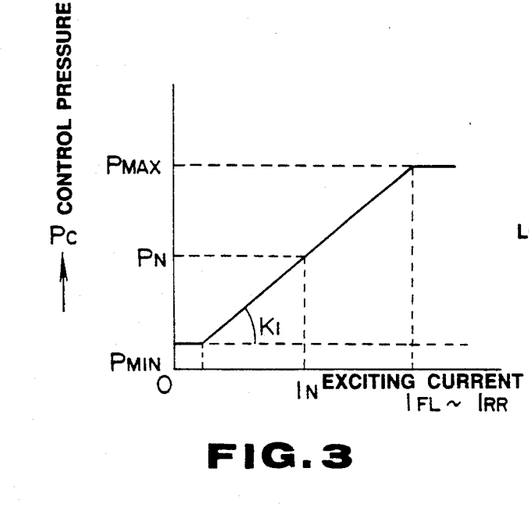
FIG. 3 is a graph which shows the relationship between output pressure of a pressure control valve and current applied thereto.

Referring to FIG. 3, the relationship between the exciting current ($I_{FL}$ to $I_{RR}$) applied to the proportional solenoid 17s and controlled pressure $P_C$ (output pressure) is shown. When the exciting current is approximately zero, the pressure control valve provides a minimum output pressure $P_{MIN}$. As the exciting current is positively increased from this level, the output pressure $P_C$ becomes great proportionally with a preselected gain $K_1$ and is then saturated at a maximum set pressure $P_{MAX}$ of the hydraulic power source 23.

The inlet port 17i and the return port 17o of the pressure control valve (17FL to 17RR) are connected to the hydraulic power source 23 through a supply line 21 and a return line 22 respectively. The control port 17c is connected to a pressure chamber of the hydraulic cylinder (15FL to 15RR) via a hydraulic line 24.

High pressure front and rear accumulators 25 are provided between the power source 23 and the pressure control valves 17FL to 17RR for accumulating excess pressure generated in the power source. Pressure accumulators 26 are disposed between the pressure control valves 17FL to 17RR and the hydraulic cylinders 15FL to 15RR through throttle valves 27 respectively for damping vibrations transmitted from a road through the wheels.

The active suspension system of the invention further includes vertical acceleration sensors 28FL to 28RR, a longitudinal acceleration sensor 29X, and a lateral acceleration sensor 29Y. The vertical acceleration sensors are arranged on portions of the vehicle body 12 adjacent the road wheels 13FL to 13RR respectively and are operable to detect vertical acceleration acting on the vehicle body to provide a signal indicative thereof to the control unit 31. The longitudinal acceleration sensor 29X and the lateral acceleration sensor are placed on the center of gravity of the vehicle for example and detect longitudinal and lateral accelerations acting on the vehicle body to provide signals to the control unit 31. With these sensors, acceleration acting on the vehicle body from different directions are detected for monitoring vehicle attitude variation.

Figure 4:
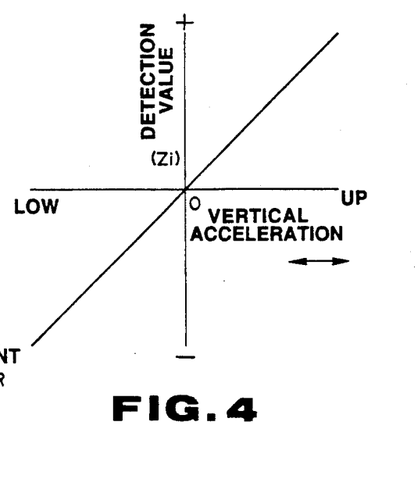
FIG. 4 is a graph which shows the relationship between vertical acceleration acting on a vehicle body and output voltage of a vertical acceleration sensor.

The vertical acceleration sensors 28FL to 28RR, as shown in FIG. 4, output detection values $\ddot{Z}_{FL}$ to $\ddot{Z}_{RR}$ which are provided with zero voltage when vertical acceleration is zero, provided with positive voltage dependent upon the magnitude of acceleration when directed upwardly, and provided with negative voltage dependent upon the magnitude of acceleration when directed downwardly.

Figure 5:
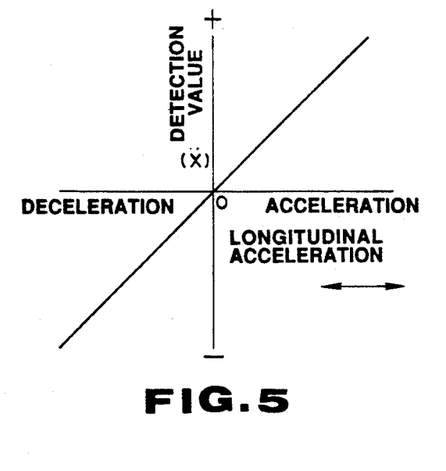
FIG. 5 is a graph which shows the relationship between longitudinal acceleration acting on a vehicle body and output voltage of a longitudinal acceleration sensor.

The longitudinal acceleration sensor 29X, as shown in FIG. 5, output detection value $\ddot{X}$ which is provided with zero voltage when longitudinal acceleration is zero, provided with positive voltage dependent upon the magnitude of acceleration when directed rearwardly caused by vehicle acceleration, and provided with negative voltage dependent upon the magnitude of acceleration when directed frontwardly as a result of braking.

Figure 6:
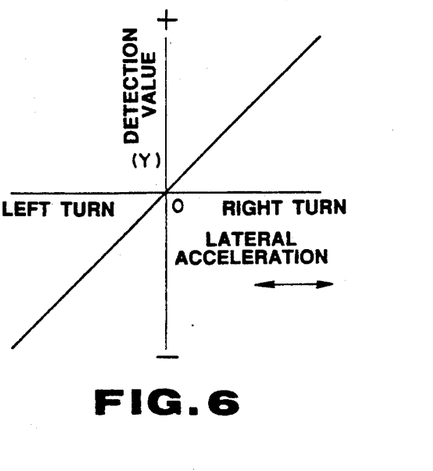
FIG. 6 is a graph which shows the relationship between lateral acceleration acting on a vehicle body and output voltage of a lateral acceleration sensor.

The lateral acceleration sensor 29Y, as shown in FIG. 6, output detection value $\ddot{Y}$ which is provided with zero voltage when lateral acceleration is zero, provided with positive voltage dependent upon the magnitude of acceleration when acting on the vehicle body from the left direction as a result of turning to the right, and provided with negative voltage dependent upon the magnitude of acceleration acting on the vehicle body from the right direction as a result of turning to the left.

The active suspension system further includes vehicle height sensors 30FL to 30RR each of which is disposed between the vehicle body 12 and the corresponding suspension member 14 for monitoring a relative distance therebetween to provide a signal indicative thereof to the control unit 31. These vehicle height sensors may be provided with potentiometers which output height detection values $H_{FL}$ to $H_{RR}$ having analog voltages respectively according to the relative distances.

Figure 7:
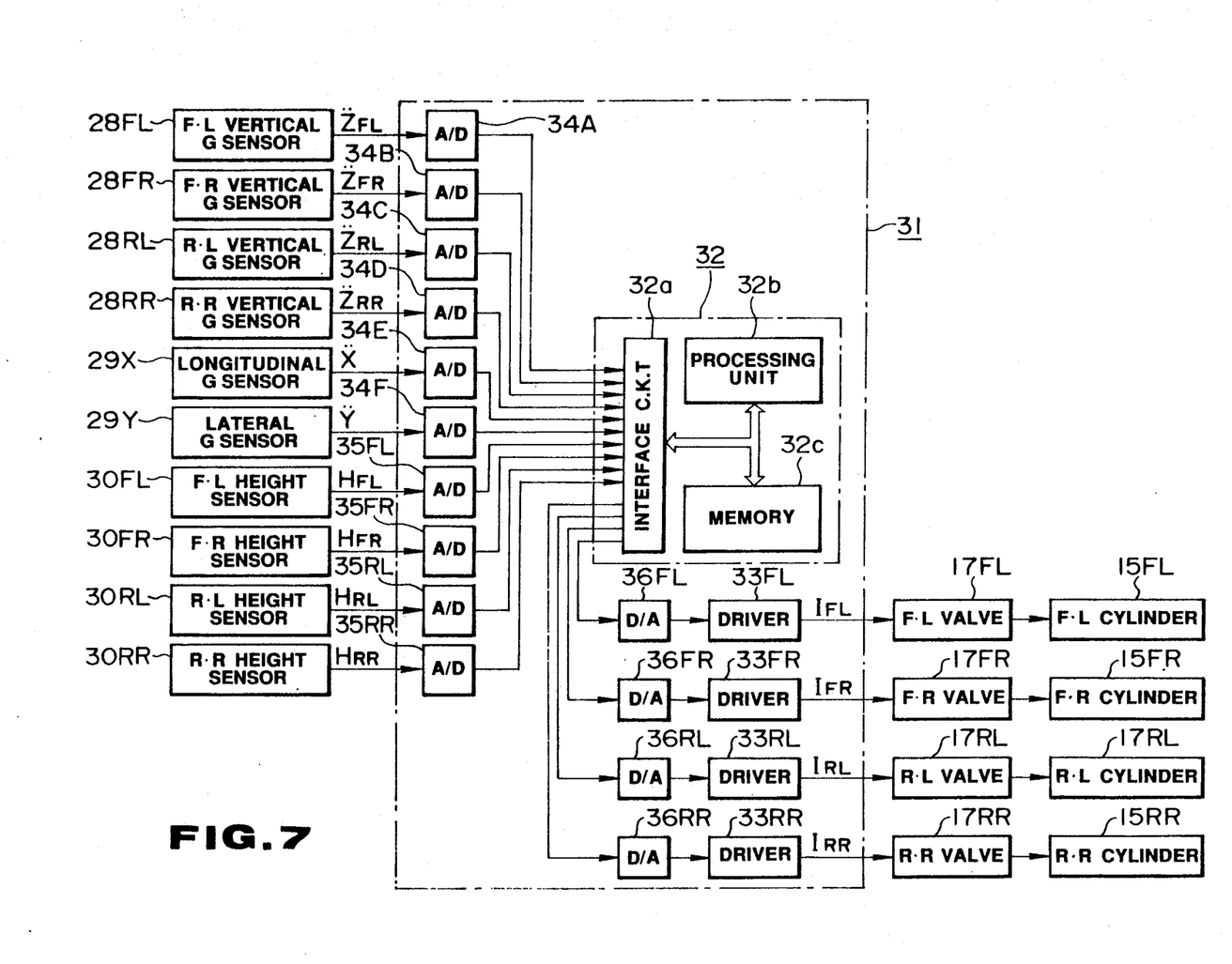
FIG. 7 is a block diagram which shows a control unit of an active suspension system of the invention.

Referring to FIG. 7, the control unit 31 is shown which includes generally a microcomputer 32 and pressure control valve driving circuits 33FL to 33RR which are responsive to pressure control signals $P_{FL}$ to $P_{RR}$ from the microcomputer 32 to operate the pressure control valves 17FL to 17RR.

The microcomputer 32 includes an interface circuit 32a, an arithmetic processing unit 32b, and a memory unit 32c. The interface circuit 32a receives signals through input ports, for receiving detection values $\ddot{Z}_{FL}$ to $\ddot{Z}_{RR}$, $\ddot{X}$, and $\ddot{Y}$ from the vertical acceleration sensors 28FL to 28RR, the longitudinal acceleration sensor 29X, and the lateral acceleration sensor 29Y, via A/D converters 34A to 34F and signals through A/D converters 35A to 35D which indicate the detection values $H_{FL}$ to $H_{RR}$ from the vehicle height sensors 30FL to 30RR. The interface circuit 32a outputs the pressure control signals $P_{FL}$ to $P_{RR}$ from its outlet ports to D/A converters 36FL to 36RR to be converted to analog signals which are, in turn, supplied to the pressure control valves 33FL to 33RR.

The arithmetic processing unit 32b is responsive to signals indicative of the vehicle height detection values $H_{FL}$ to $H_{RR}$ from the vehicle height sensors 30FL to 30RR through the interface circuit 32a to compare them with a target vehicle height level $H_S$ and then calculates vehicle height control values $PH_{FL}$ to $PH_{RR}$ so that the vehicle height detection values $H_{FL}$ to $H_{RR}$ reach the target vehicle height level. The arithmetic processing unit 32b is also responsive to the signals indicating the vertical acceleration detection values $\ddot{Z}_{FL}$ to $\ddot{Z}_{RR}$ from the vertical acceleration sensors 28FL to 28RR to convert them to vertical speeds by low-pass filtering which functions as an integrating circuit within a range of resonance frequency and then multiplies the vertical speed by a bouncing control gain $K_Z$ to provide anti-bouncing control values $PB_{FL}$ to $PB_{RR}$. The arithmetic processing unit 32b is further responsive to the signals indicating the longitudinal acceleration detection value $\ddot{X}$ from the longitudinal acceleration sensor 29X to multiply it with a pitching control gain $K_P$ to provide an anti-pitching control value PP and is further responsive to a signal indicating the lateral acceleration detection value $\ddot{Y}$ from the lateral acceleration sensor 29Y to multiply it with a rolling control gain $K_R$ to provide an anti-rolling control value PR. After providing the control values, these are added and/or subtracted to and/or from each other to mathematically project the pressure control signals $P_{FL}$ to $P_{RR}$ which are, in turn, output to the D/A converters 34FL to 34RR through the interface circuit 32a. At this time, determination is made as to whether the vehicle body is being lowered or not. It is concluded that vehicle movement is directed downwardly the control gains $K_Z$, $K_P$, and $K_R$ are set to values smaller than the control gains provided when the vehicle body rises.

The memory unit 32c includes generally a RAM and a ROM which pre-stores a program necessary for the arithmetic processing unit 32b to arithmetically process and store the arithmetic results from the arithmetic circuit 32b, in sequence.

The pressure control valve drivers 33FL to 33RR may be respectively provided with a floating type constant-current circuit for example which is responsive to input of pressure control voltages $V_{FL}$ to $V_{RR}$ from the D/A converters 36FL to 36RR to provide exciting currents $I_{FL}$ to $I_{RR}$ to the proportional solenoids 17s of the pressure control valves 15FL to 15RR.

Figure 8A:
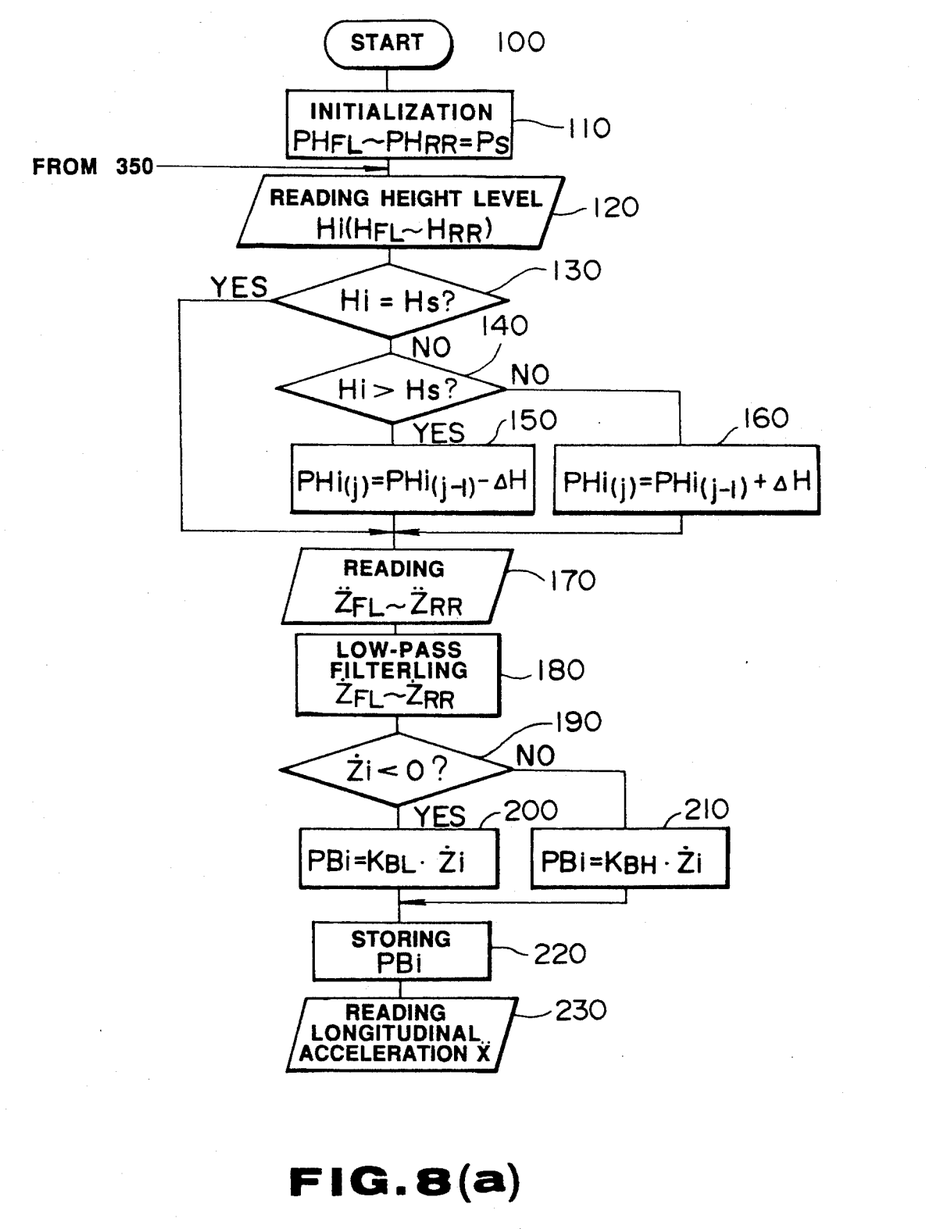
FIGS. 8(a) and 8(b) are flowcharts which show logical steps performed by a control unit of an active suspension system.
Figure 8B:
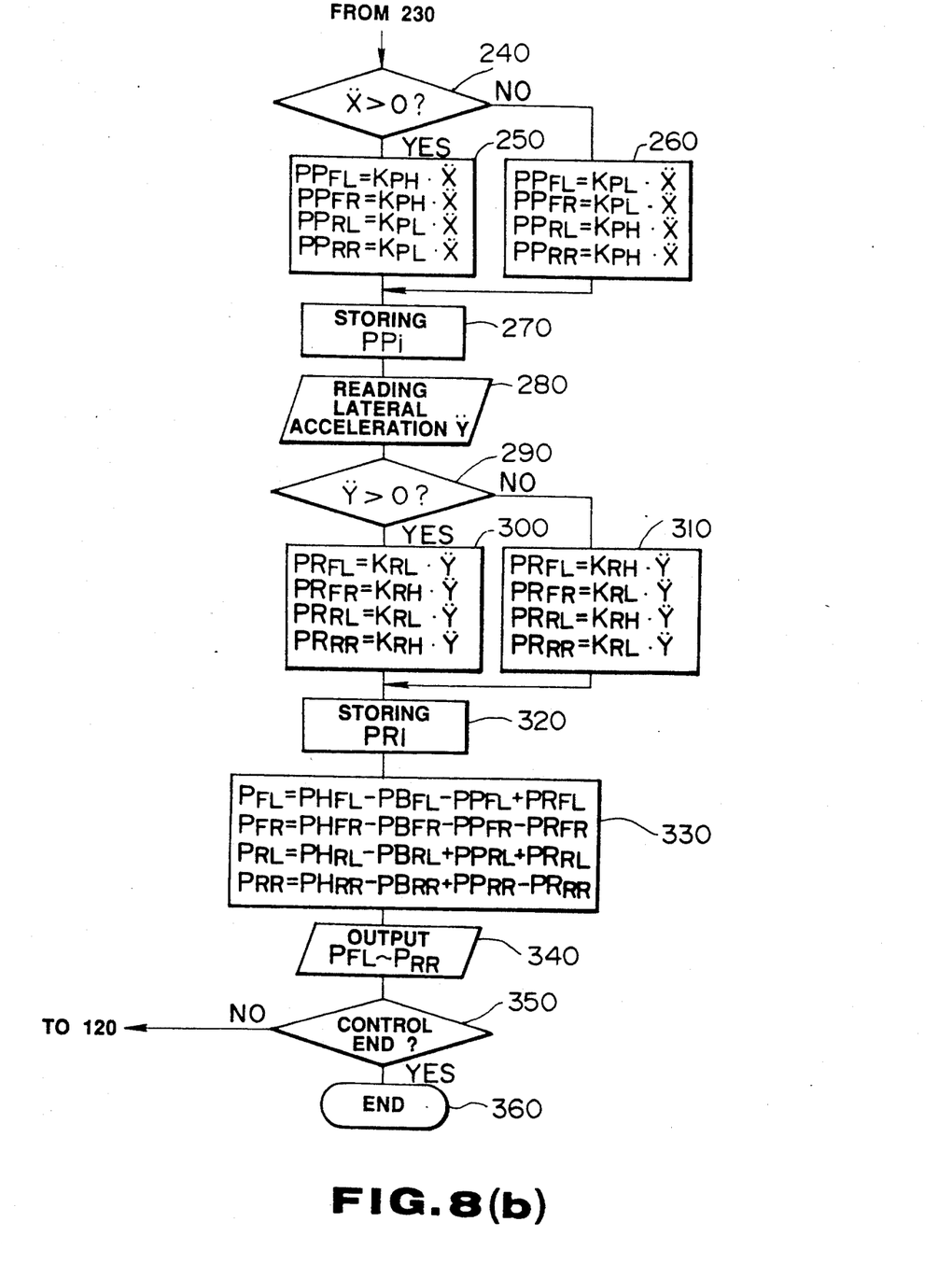

Referring to FIG. 7, FIGS. 8 (a) and 8 (b) there is shown a flowchart of a program or sequence of logical steps performed by the arithmetic circuit 32b. This program is carried out by timer interrupt at a preselected time interval beginning from a time the ignition switch is turned on to supply power to the control unit 31.

After entering the program at step 100, the routine proceeds to step 110 wherein the control unit 31 sets the pressure control signals $P_{FL}$ to $P_{RR}$ for the pressure control valves 15FL to 15RR to a pressure control value $P_S$ required for maintaining the vehicle body at level orientation at the target vehicle height level $H_S$ when the vehicle has a standard load capacity.

The routine then proceeds to step 120 wherein the control unit 31 is responsive to the signals from the vehicle height sensors 30FL to 30RR indicating the vehicle height detection levels $H_{FL}$ to $H_{RR}$ to mathematically provide a vehicle height adjusting pressure control value $PH_i$ based on the detected vehicle height level $H_i$ (i=FL to RR) through steps 130 to 170.

In step 130, it is determined whether the detected vehicle height level $H_i$ is equal to the target vehicle height level $H_s$ or not. If a NO answer is obtained ($H_i \neq H_s$), it is concluded that vehicle height adjustment is necessary and the routine proceeds to step 140 wherein it is determined whether the detected vehicle height level $H_i$ is greater than the target vehicle height level $H_s$. If a YES answer is obtained ($H_i > H_s$), it is concluded that the vehicle height adjustment is necessary to lower the vehicle height level and the routine proceeds to step 150 wherein a preselected value $\Delta H$ is subtracted from a pressure control value $PH_{i(j-1)}$ in the previous processing cycle to provide a new pressure control value $PH_{i(j)}$ (=$PH_{i(j-1)} - \Delta H$) which is stored in a storage region of the memory unit 32c for vehicle height level adjustment pressure control values to update data stored therein. Alternatively, if a NO answer is obtained in step 140 ($H_i < H_s$), it is concluded that the vehicle height adjustment is necessary to raise the vehicle height level and the routine then proceeds to step 160 wherein the preselected value $\Delta H$ is added to the previous pressure control value $PH_{i(j-1)}$ to provide a new pressure control value $PH_{i(j)}$ (=$PH_{i(j-1)} + \Delta H$) which is, in turn, stored in the storage region for vehicle height level adjustment pressure control values of the memory unit 32c to update data stored therein. Afterward, the routine proceeds to step 170.

In step 170, the control unit 31 receives signals indicating the vertical acceleration detection values $\ddot{Z}_{FL}$ to $\ddot{Z}_{RR}$ from the vertical acceleration sensors 28FL to 28RR. The routine then proceeds to step 180 wherein each vertical acceleration detection value $\ddot{Z}_i$ is low-pass filtered to provide vertical speed $\dot{Z}_i$. The routine then proceeds to step 190 wherein it is determined whether the vertical speed $\dot{Z}_i$ is a negative value (−) or not. This determination is made to judge whether the vehicle body is being lowered or not. If a NO answer is obtained indicating that the vertical speed is greater than or equal to zero ($\dot{Z}_i \geq 0$), it is concluded that the vehicle body is not being lowered and then the routine proceeds to step 210 wherein the vertical speed $\ddot{Z}_i$ is multiplied by a preselected pressure reduction bouncing control gain $K_{ZH}$ to mathematically provide an anti-bouncing pressure control value $PB_i$ and then the routine proceeds to step 220. Alternatively, if a YES answer is obtained in step 190 ($\dot{Z}_i < 0$) indicating that the vehicle body is being lowered, the routine proceeds to step 200 wherein the vertical speed $\dot{Z}_i$ is multiplied by a preselected pressure intension bouncing control gain $K_{ZL}$ which is smaller than the pressure reduction bouncing control gain $K_{ZH}$ by preselected magnitude to mathematically provide an anti-bouncing pressure control value $PB_i$. The routine then proceeds to step 220 wherein the anti-bouncing pressure control value $PB_i$ is stored in a storage region for the anti-bouncing pressure control value to update data stored therein.

After completing the above anti-bouncing processing, the routine proceeds to step 230 wherein the control unit 31 receives the signal indicative of the longitudinal acceleration detection value $\ddot{X}$ from the longitudinal acceleration sensor 29X. The routine then proceeds to step 240 wherein it is determined whether the longitudinal acceleration detection value is a positive value or not. This determination is made to judge whether the vehicle is being accelerated or decelerated for determining which the hydraulic cylinders 15FL to 15RR internal pressure is necessary to be increased. If a YES answer is obtained ($\ddot{X} > 0$), the routine proceeds to step 250 wherein the longitudinal acceleration detection value $\ddot{X}$ is multiplied by a relatively large pressure reduction pitching control gain $K_{PH}$ to provide anti-pitching pressure control values $PP_{FL}$ and $PP_{FR}$ for the front-left and front-right pressure control valves 17FL and 17FR. Additionally, the longitudinal acceleration detection value $\ddot{X}$ is multiplied by a pressure intension pitching control gain $K_{PL}$ which is smaller than the pressure reduction pitching control gain $K_{PH}$ by preselected magnitude to provide anti-pitching pressure control values $PP_{RL}$ and $PP_{RR}$ for the rear-left and rear-right pressure control valves 17RL and 17RR. If a NO answer is obtained ($\ddot{X} < 0$) in step 240, the routine proceeds to step 260 wherein the longitudinal acceleration detection value $\ddot{X}$ is multiplied by the above pressure intention pitching control gain $K_{PL}$ to provide anti-pitching pressure control values $PP_{FL}$ and $PP_{FR}$ for the front-left and front-right pressure control valves 17FL and 17FR and the longitudinal acceleration detection value $\ddot{X}$ is also multiplied by the above pressure reduction pitching control gain $K_{PH}$ to provide anti-pitching pressure control values $PP_{RL}$ and $PP_{RR}$ for the rear-left and rear-right pressure control valves 17RL and 17RR. After steps 250 or 260, the routine proceeds to step 270 wherein the anti-pitching pressure control values $PP_{FL}$ to $PP_{RR}$ provided in steps 250 or 260 are stored in a storage region for anti-pitching pressure control values to update data stored therein. After completing the above anti-pitching control processing, the routine proceeds to step 280 wherein the control unit 31 receives the signal indicative of the lateral acceleration detection value Y from the lateral acceleration sensor 29Y. The routine then proceeds to step 290 wherein it is determined whether the lateral acceleration detection value is a positive value or not ($\ddot{Y} > 0$). This determination is made for judging whether the vehicle is turned to the right or the left to determine which the hydraulic cylinders 15FL to 15RR internal pressure is necessary to be increased. If a YES answer is obtained ($\ddot{Y} > 0$), it is concluded that the vehicle is turning to the right and then the routine proceeds to step 300 wherein the lateral acceleration detection value $\ddot{Y}$ is multiplied by a relatively large pressure reduction rolling control gain $K_{RH}$ to provide anti-rolling pressure control values $PR_{FR}$ and $PR_{RR}$ for the front-right and rear-right pressure control valves 17FR and 17RR and the lateral acceleration detection value $\ddot{Y}$ is also multiplied by a pressure intension rolling control gain $K_{RL}$ which is smaller than the above pressure reduction rolling control gain $K_{RH}$ to provide anti-rolling pressure control values $PR_{FL}$ and $PR_{RL}$ for the front-left and rear-left pressure control valves 17FL and 17RL. Alternatively, if a NO answer is obtained ($\ddot{Y} > 0$) in step 290, it is concluded that the vehicle is turning to the left and then the routine proceeds to step 310 wherein the lateral acceleration detection value $\ddot{Y}$ is multiplied by the above pressure reduction rolling control gain $K_{RH}$ to provide anti-rolling pressure control values $PR_{FL}$ and $PR_{RL}$ for the front-left and rear-left pressure control valves 17FL and 17RL and the lateral acceleration detection value Y is also multiplied by the above pressure intension rolling control gain $K_{RL}$ to provide anti-rolling pressure control values $PR_{RL}$ and $PR_{RR}$ for the front-right and rear-right pressure control valves 17FR and 17RR. After step 300 or 310, the routine proceeds to step 320 wherein the anti-rolling pressure control values $PR_{FL}$ to $PR_{RR}$ are stored in a storage region for anti-rolling pressure control values of the memory unit 32c to update data stored therein.

After the above anti-rolling program terminates, the routine proceeds to step 330 wherein the pressure control values $PH_{FL}$ to $PH_{RR}$, $PB_{FL}$ to $PB_{RR}$, $PP_{FL}$ to $PP_{RR}$, and $PR_{FL}$ to $PR_{RR}$ are read out from the storage regions of the memory unit 32c respectively and based thereon pressure control values $P_{FL}$ to $P_{RR}$ for the pressure control valves 15FL to 15RR are mathematically calculated according to the following equations.

$$P_{FL} = PH_{FL} - PB_{FL} - PP_{FL} + PR_{FL} \quad (1)$$

$$P_{FR} = PH_{FR} - PB_{FR} - PP_{FR} - PR_{FR} \quad (2)$$

$$P_{RL} = PH_{RL} - PB_{RL} + PP_{RL} + PR_{RL} \quad (3)$$

$$P_{RR} = PH_{RR} - PB_{RR} + PP_{RR} - PR_{RR} \quad (4)$$

The routine then proceeds to step 340 wherein the pressure control values $P_{FL}$ to $P_{RR}$ are output to the D/A converters 36FL to 36RR. The routine then proceeds to step 350 wherein it is determined whether preselected program termination conditions are satisfied or not. If a NO answer is obtained, the routine returns to step 120. Alternatively, if a YES answer is obtained, the routine proceeds to step 360 wherein the program terminates. The program termination conditions may be provided with passage of a preselected period of time after the ignition switch is changed from ON to OFF positions. In other words, the power of the control unit 31 is self-held after turning off the ignition switch to carry out the program for the preselected period of time.

In operation, when the vehicle is stopped on an even road, the vertical acceleration sensor 28FL to 28RR, longitudinal acceleration sensor 29X, and lateral acceleration sensor 29Y output signals which indicate the acceleration detection values $\ddot{Z}_{FL}$ to $\ddot{Z}_{RR}$, $\ddot{X}$, and $\ddot{Y}$ each having zero voltage.

As a result of zero voltage output from the acceleration sensors, in steps 210, 260, and 310, the anti-bouncing pressure control value $PB_i$, the anti-pitching pressure control value $PP_i$, and the anti-rolling pressure control value $PR_i$ become zero. Thus, in step 340, only pressure control values $PH_{FL}$ to $PH_{RR}$ for suppressing variation in vehicle height level are mathematically provided as the pressure control values $P_{FL}$ to $P_{RR}$ to be output to the D/A converters 35FL to 35RR. The pressure control valve drivers 33FL to 33RR output the exciting currents $I_{FL}$ to $I_{RR}$ dependent upon the pressure control voltages $V_{FL}$ to $V_{RR}$ from the D/A converters 35FL to 35RR to the proportional solenoids 17s of the pressure control valves 17FL to 17RR, thereby increasing or decreasing control pressures $P_c$ of the pressure control valves 17FL to 17RR to change thrust of the piston rod of hydraulic cylinders 15FL to 15RR for adjusting the vehicle height level to the target level.

If passengers embark, or disembark the vehicle to raise, or lower the vehicle height, in step 140 after steps 120 and 130, the detected vehicle height level $H_i$ is smaller than the target vehicle height level $H_s$, that is, $H_i < H_s$ (or $H_i > H_s$). In steps 160 (or 150), the preselected value $\Delta H$ is added to (or subtracted from) the previous vehicle height adjustment pressure control values $PH_{i(j-1)}$ to increase (or decrease) the vehicle height adjustment pressure control value $PH_{i(j)}$, thereby increasing (or decreasing) the pressure control values $P_{FL}$ to $P_{RR}$. Therefore, the internal pressure of the hydraulic cylinders 15FL to 15RR are elevated (or reduced) to raise (or lower) the vehicle height. When the detected vehicle height level $H_i$ coincides with the target vehicle height level $H_s$ after repeating the vehicle height level control for certain times, vehicle height level control is stopped to maintain the vehicle body at the target level.

Figure 9A:
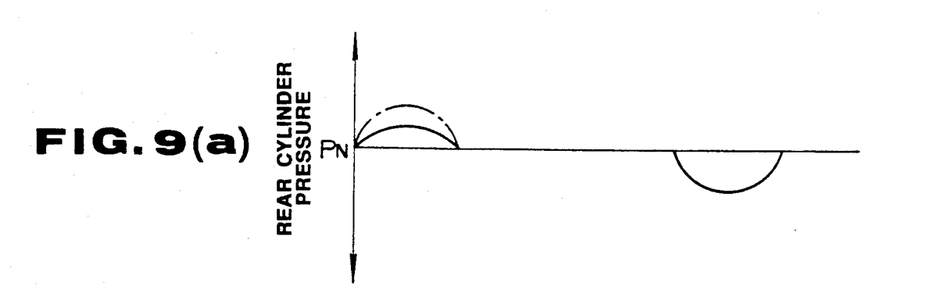
FIGS. 9(a), 9(b), 9(c), and 9(d) are timecharts which respectively show pressure variation in a working fluid cylinder.

If the vehicle starts while the vehicle height level control is stopped, the longitudinal acceleration sensor 29X outputs a signal indicative of longitudinal acceleration detection value X acting on the vehicle body which has a positive voltage. Thus, in step 240 a YES answer is obtained, the routine then proceeds to step 250 wherein the longitudinal acceleration detection value $\ddot{X}$ is multiplied by the relatively large pressure reduction pitching control gain $K_{PH}$ to provide the anti-pitching pressure control values $PP_{FL}$ and $PP_{FR}$ for the front-left and front-right pressure control valves 17FL and 17FR. Additionally, the longitudinal acceleration detection value $\ddot{X}$ is multiplied by the pressure intension pitching control gain $K_{PL}$ which is smaller than the pressure reduction pitching control gain $K_{PH}$ by preselected magnitude to provide the anti-pitching pressure control values $PP_{RL}$ and $PP_{RR}$ for the rear-left and rear-right pressure control valves 17RL and 17RR. It will be appreciated that the anti-pitching pressure control values $PP_{RL}$ and $PP_{RR}$ for the rear wheels are smaller than the anti-pitching pressure control values $PP_{FL}$ and $PP_{FR}$ for the front wheels with all anti-pitching pressure control values $PP_{FL}$ to $PP_{RR}$ being positive values. Thus, in step 340, the pressure control values $P_{RL}$ and $P_{RR}$ for the rear wheels are, as is clear from equations (3) and (4), provided with addition of the pitching pressure control values $PP_{RL}$ and $PP_{RR}$ to the vehicle height adjustment pressure control values $PH_{RL}$ and $PH_{RR}$. On the other hand, the pressure control values $P_{FL}$ and $P_{FR}$ for the front wheels are, as is clear from equations (1) and (2), provided with subtraction of the pitching pressure control values $PP_{FL}$ and $PP_{FR}$ from the vehicle height adjustment pressure control values $PH_{FL}$ and $PH_{FR}$. This increases thrust of the hydraulic cylinders 15RL and 15RR for the rear wheels, while thrust of the piston rods of the hydraulic cylinders 15FL and 15FR are decreased, preventing squatting which causes the rear of vehicle body to be lowered as a result of acceleration acting on the vehicle body from occurring for maintaining the vehicle body substantially horizontal. At this time, an amount of pressure elevation of the hydraulic cylinders 15RL and 15RR for the rear wheels from a neutral pressure $P_N$, as shown in FIG. 9(a), is restricted to a value smaller than an amount of pressure reduction of the hydraulic cylinders 15FL and 15FR for the front wheels from the neutral pressure $P_N$. This restricts an increase in friction due to pressure elevation which is created between the piston rod 15d and the seal ring 15l to a minimum value for establishing smooth sliding of the piston rod 15d.

Figure 9B:
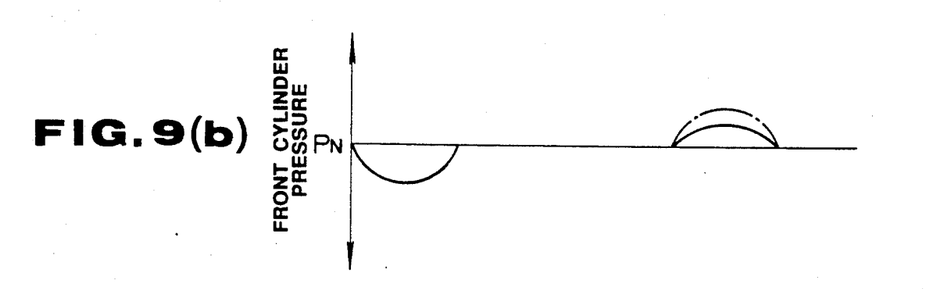

If the vehicle is braked while traveling at a constant speed, the longitudinal acceleration sensor 29X outputs a signal indicative of a longitudinal acceleration detection value $\ddot{X}$ having a negative voltage. In contrast to the above, thrust of the piston rod of the hydraulic cylinders 15FL and 15FR for the front wheels are increased with thrust of the hydraulic cylinders 15RL and 15RR for the rear wheels being decreased. This prevents nose-diving from occurring due to deceleration acting on the vehicle body which causes the front thereof to be lowered to maintain the vehicle body substantially horizontal. At this time, a gain of pressure in the hydraulic cylinders 15FL and 15FR for the front wheels from the neutral pressure $P_N$, as shown in FIG. 9(b), is restricted to a value smaller than an amount of pressure reduction of the hydraulic cylinders 15RL and 15RR for the rear wheels, from the neutral pressure $P_N$. Similar to the increase operation described previously, this ensures smooth sliding of the piston rod 15d of the hydraulic cylinders 15RL and 15RR.

If the vehicle is turned to the right (or the left) from a straight running status, the lateral acceleration sensor 29Y outputs a signal indicative of the lateral acceleration detection value $\ddot{Y}$ having a positive value. Thus, after a YES answer is obtained in step 290, the routine then proceeds to step 300 wherein the anti-rolling pressure control values $PR_{FL}$ and $PR_{RL}$ for the left wheels (or the anti-rolling pressure control values $PR_{FR}$ and $PR_{RR}$ for the right wheels) are provided which are smaller than the anti-rolling pressure control values $PR_{FR}$ and $PR_{RR}$ for the right wheels (or the anti-rolling pressure control values $PR_{FL}$ and $PR_{RL}$ for the left wheels) with the pressure control values $PR_{FL}$ to $PR_{RR}$ being positive values (or negative values). Therefore, thrust of the piston rod of the hydraulic cylinders 15FL and 15RL for the left wheels are increased (or decreased) with thrust of the piston rod of the hydraulic cylinders 15FR and 15RR for the right wheels being decreased (or increased), thereby suppressing rolling motion of the vehicle body to maintain the vehicle body at a level orientation and a horizontal height. In this anti-rolling control, an amount of pressure elevation of the hydraulic cylinders 15FL and 15RL (or the hydraulic cylinders 15FR and 15RR) for the left wheels (or the right wheels) is provided which is smaller than an amount of pressure reduction of the hydraulic cylinders 15FR and 15RR (or the hydraulic cylinders 15FL and 15RL) for the right wheels (or the left wheels). It will be appreciated that low friction is provided between the piston rod 15d and the seal ring 15l of the hydraulic cylinder inner pressure of which is increased for ensuring smooth sliding motion of the piston rod 15d.

Figure 9C:
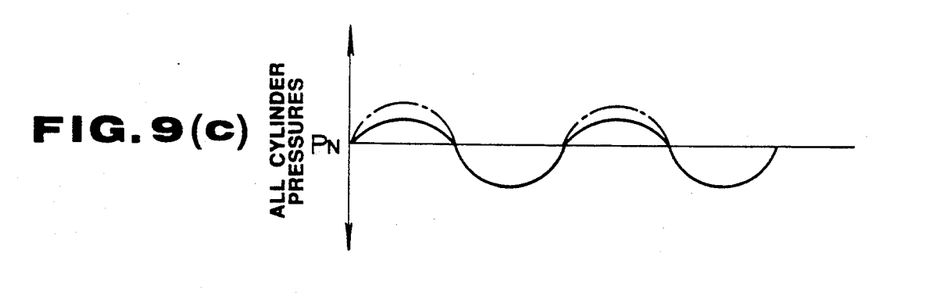

If bouncing motion is created while the vehicle travels on an uneven road, the vertical acceleration sensors 28FL to 28RR output signals indicative of the vertical acceleration detection values $\ddot{Z}_{FL}$ to $\ddot{Z}_{RR}$. In step 180, the vertical acceleration detection values $\ddot{Z}_{FL}$ to $\ddot{Z}_{RR}$ are converted to the vertical speeds $\dot{Z}_{FL}$ to $\dot{Z}_{RR}$. If the vehicle body rises, the vertical speeds $\dot{Z}_{FL}$ to $\dot{Z}_{RR}$ represent positive values. The routine thus proceeds from step 190 to step 210 wherein the vertical speeds $\dot{Z}_{FL}$ to $\dot{Z}_{RR}$ are multiplied by the large anti-bouncing control gain $K_{BH}$ to provide the large anti-bouncing pressure control values $PB_{FL}$ to $PB_{RR}$. As a result, thrust of the hydraulic cylinders 15FL to 15RR are decreased to suppress rising of the vehicle body. On the other hand, when the vehicle body moves downwardly, the vertical speeds $\dot{Z}_{FL}$ to $\dot{Z}_{RR}$ indicate negative values. Thus, after a YES answer is obtained in step 190, the routine proceeds to step 200 wherein the vertical speeds $\dot{Z}_{FL}$ to $\dot{Z}_{RR}$ are multiplied by the small anti-bouncing control gain $K_{BL}$ to provide the small anti-bouncing pressure control values $PB_{FL}$ to $PB_{RR}$ with the result that trust of the hydraulic cylinders 15FL to 15RR are increased. However, a gain of pressure in the hydraulic cylinder is, as shown in FIG. 9(c), smaller than a pressure reduction. This results in smooth sliding motion of the piston rod 15d.

While the above embodiment is directed to changing the magnitude of the control gains to adjust the pressure control values, the present invention is not limited to this arrangement. For example, it is preferable that when the vehicle moves downwardly, a preselected value is subtracted from a calculated pressure control value. Further, an upper limit may be preset as the pressure control value if the pressure control value is excessively high.

Additionally, in the above embodiment, an amount of pressure increase of the hydraulic cylinder internal pressure of which is increased is restricted in all bouncing, rolling, and pitching motion suppressive control. However, this restriction of the amount of pressure increase may be effected selectively in any of the bouncing, rolling, or pitching motion suppressive controls.

Figure 9D:
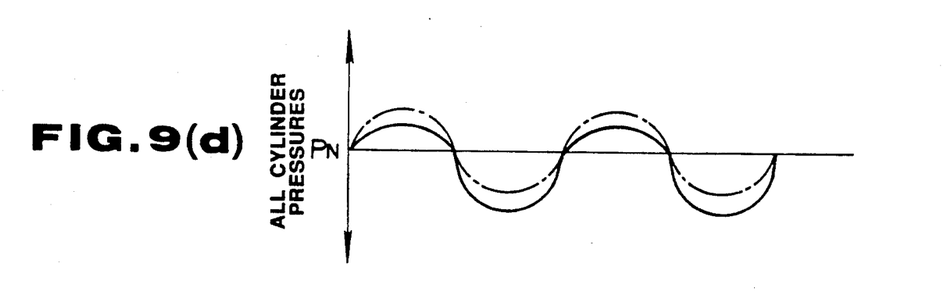

Further, the control gain for increasing hydraulic cylinder pressure is smaller than the control gain for decreasing hydraulic cylinder pressure may tend to cause the vehicle body to move unsteadily during anti-bouncing motion control, giving vehicle passengers an unpleasant feeling as compared with provision of control gains equal to each other for both pressure increase and decrease. Thus, as shown in FIG. 9(d), the control gain for increasing internal pressure of the hydraulic cylinder can be reduced by and amount which may be added to the control gain for reducing internal pressure of the hydraulic cylinder with a constant total gain for preventing unsteady movement of the vehicle body to provide good riding comfort.

The control unit 31 may be additionally provided with electronic circuits including a comparator, a logic circuit or so forth.

The hydraulic fluid may be provided with another type of working fluid which has a low compression ratio.

As already mentioned, with the above system, when increasing pressure of the hydraulic cylinder for suppressing bouncing, rolling, or pitching motion a variation in pressure is provided which is smaller than that when decreasing pressure of the hydraulic cylinder. This therefore restricts an upper limit of internal pressure of the hydraulic cylinder to a lower value, restricting friction between the piston rod and the seal ring of the hydraulic cylinder below a preselected level which allows the piston rod to displace smoothly in the cylinder.

What is claimed is:

1. An active suspension control system for a vehicle, comprising:
   sensor means for sensing vehicle attitude change to provide a signal indicative thereof;
   suspension assemblies including actuators which are respectively disposed between a vehicle body and suspension members supporting vehicle wheels rotatably, each of the actuators including a sliding member which slides in the actuator to adjust a relative distance between the vehicle body and the suspension member to suppress a vehicle attitude change;

a fluid power source unit which supplies pressurized fluid to the actuators for displacing the sliding member dependent upon the magnitude of fluid pressure; and pressure control means responsive to the signal from said sensor means for controlling the fluid pressure supplied from said fluid power source unit of the actuators dependent upon an amount of vehicle attitude change to suppress said vehicle attitude change, said pressure control means decreasing the fluid pressure to the actuator associated with a portion of the vehicle body which is rising during the vehicle attitude change by a first ratio and increasing the fluid pressure to the actuator associated with a portion of the vehicle body which is lowering during the vehicle attitude change by a second ratio smaller than the first ratio by a preselected value for restricting friction caused by increase an in the fluid pressure in the actuator which impinges upon sliding movement of the sliding member.

2. A system as set forth in claim 1, wherein said pressure control means multiplies an amount of vehicle attitude change sensed by said sensor means by a control gain to determine variations in the fluid pressure to be supplied to the actuators required for active suspension control, the control gain being provided with a first gain when decreasing the fluid pressure and a second gain smaller than the first gain by a preselected value when increasing fluid pressure.

3. A system as set forth in claim 2, wherein said sensor means includes a lateral acceleration sensor which monitors rolling motion of the vehicle body to provide a signal indicative thereof, said pressure control means decreasing fluid pressure by the first gain to be supplied to the actuator of the suspension assembly provided on a first side where a relative distance between the wheel and the vehicle body is lengthened caused by the rolling motion and increasing the fluid pressure by the second gain to be supplied to the actuator of the suspension assembly provided on a second side opposite the first side where a relative distance between the vehicle body and the wheel is shortened caused by the rolling motion.

4. A system as set forth in claim 2, wherein said sensor means includes a longitudinal acceleration sensor which monitors pitching motion of the vehicle body to provide a signal indicative thereof, said pressure control means decreasing the fluid pressure by the first gain to be supplied to the actuator of the suspension assmebly provided on a first side where a relative distance between the wheel and the vehicle body is lengthened caused by the pitching motion and increasing the fluid pressure by the second gain to be supplied to the actuator of the suspension assembly provided on a second side opposite the first side where a relative distance between the vehicle body and the wheel is shortened caused by the pitching motion.

5. A system as set forth in claim 2, wherein said sensor means includes a vertical acceleration sensor which monitors bouncing motion of the vehicle body to provide a signal indicative thereof, said pressure control means decreasing the fluid pressure by the first gain when the bouncing motion is directed downwardly and increasing the fluid pressure by the second gain when the bounding motion is directed upwardly.

6. A system as set forth in claim 1, wherein said pressure control means determines variation in the fluid pressure to be supplied to the actuators based on a vehicle attitude change sensed by said sensor means to provide a first pressure level lowered by the determined variation and a second pressure level elevated by the determined variation which are required for suppressing the vehicle attitude change, said pressure control means decreasing the fluid pressure to the actuator associated with the portion of the vehicle body rising the vehicle attitude change toward a level which is lower than the first pressure level by a first value and increasing the fluid pressure to the actuator associated with the portion of the vehicle body lowering during the vehicle attitude change toward a level which is lower than the second pressure level by a second value.

7. A system as set forth in claim 6, wherein the first value and the second value are the same.

* * * * *